United States Patent [19]

Stream

[11] 3,932,163

[45] Jan. 13, 1976

[54] APPARATUS FOR PRODUCING A SLIVER-LIKE FIBROUS PRODUCT

[75] Inventor: Ralph M. Stream, Newark, Ohio

[73] Assignee: Owens-Corning Fiberglas Corporation, Toledo, Ohio

[22] Filed: Feb. 18, 1975

[21] Appl. No.: 550,384

Related U.S. Application Data

[63] Continuation of Ser. No. 425,589, Dec. 17, 1973, abandoned.

[52] U.S. Cl. .......................... 65/9; 19/150; 28/21; 28/72 SP; 65/9; 65/16; 226/95
[51] Int. Cl.² ...................................... C03B 37/02
[58] Field of Search............ 65/2, 4, 11 R, 11 W, 5, 65/6, 8, 14–16; 226/95; 28/21, 72 SP; 19/150

[56] References Cited
UNITED STATES PATENTS

| | | | |
|---|---|---|---|
| 2,132,702 | 10/1938 | Simpson | 65/9 X |
| 2,216,759 | 10/1940 | Simison | 65/9 |
| 2,450,915 | 10/1948 | Powell | 65/11 R X |
| 2,871,502 | 2/1959 | Whisnant | 226/95 X |
| 2,897,874 | 8/1959 | Stalego et al. | 65/6 X |
| 3,768,752 | 10/1973 | Bettini et al. | 226/95 X |

Primary Examiner—Robert L. Lindsay, Jr.
Attorney, Agent, or Firm—Carl G. Staelin; John W. Overman; Ronald C. Hudgens

[57] ABSTRACT

Apparatus for and the method of producing a sliver-like fibrous product including forming glass fibers, conveying the glass fibers in a body of gas and depositing them on the porous rim of a rotating wheel to form a coherent web, advancing the porous rim with the web thereon over an opening having a progressively reducing size in the direction of rim movement, establishing a zone of reduced pressure within the wheel to draw air through the fibers into the opening to progressively condense the web into a loosely associated longitudinal coherent sliver-like grouping of fibers, and discharging the longitudinal sliver-like fiber grouping from the rim.

9 Claims, 8 Drawing Figures

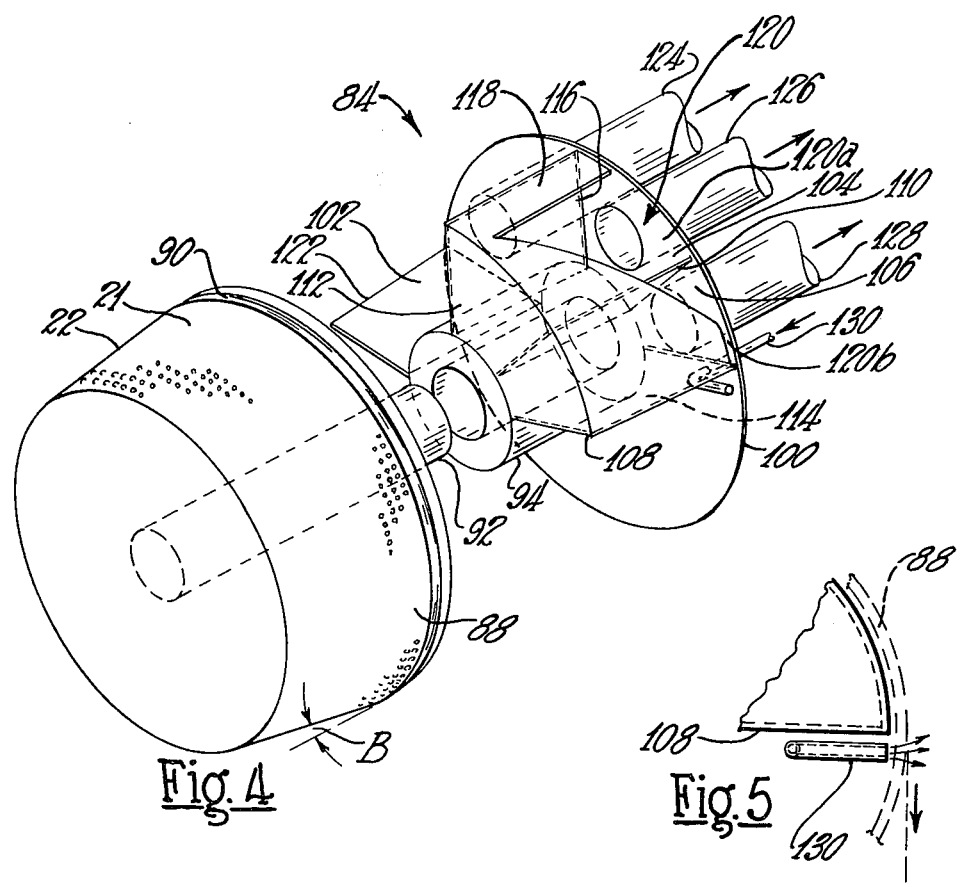

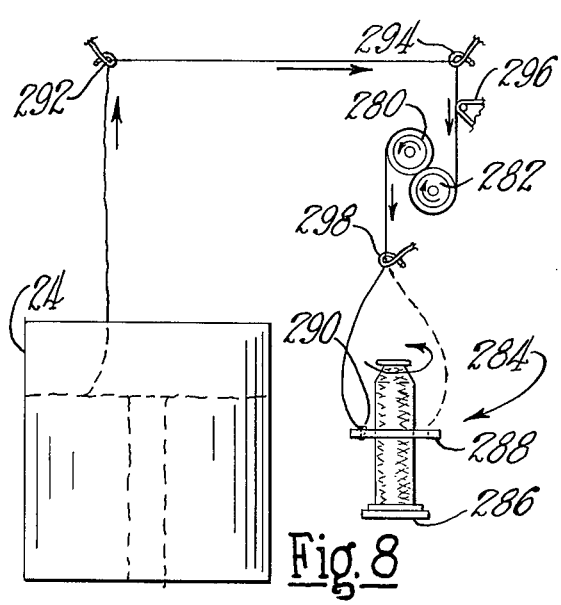
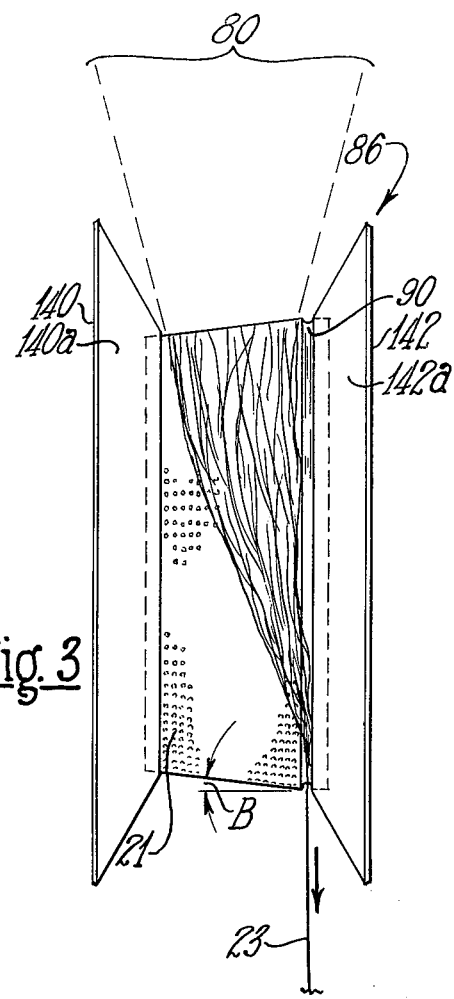
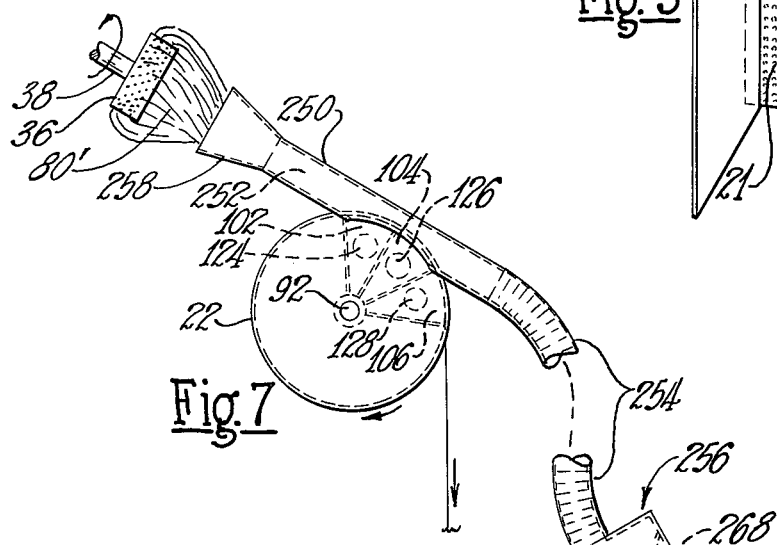
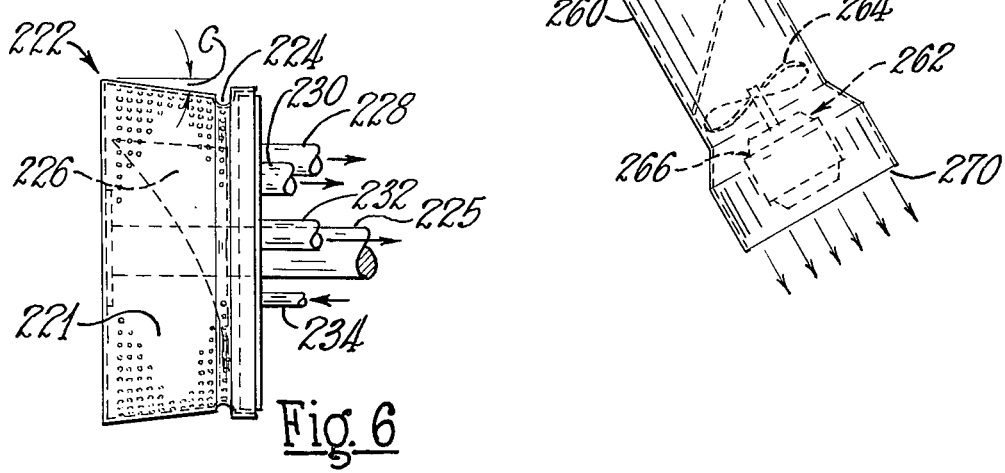

APPARATUS FOR PRODUCING A SLIVER-LIKE FIBROUS PRODUCT

This is a continuation of application Ser. No. 425,589, filed Dec. 17, 1973, now abandoned.

BACKGROUND OF THE INVENTION

Textile yarn made of continuous synthetic filaments are dense and are artificial feeling. Hence, there has been a need to produce synthetic filament textile yarns that look and feel like natural fiber yarns.

Yarn texturing is one conventional commercial way to produce a more natural appearance and feel to continuous synthetic fiber yarn. Here continuous filament yarn is processed in one of several conventional ways. For example, the yarn can be processed by false-twist, knit-de-knit or air bulking apparatus. Such apparatus produces bulky continuous filament yarn that meets some textile needs.

Another conventional commercial approach produces what is known as "spun yarn." Continuous filaments are formed into a heavy weight bundle called a tow that is subsequently crimped and chopped into short lengths. These chopped fibers, called staple fibers, are then processed through modified spinning apparatus into "spun yarn." This yarn has a softer feel and more natural appearance than continuous synthetic filament yarn.

Each of these basic conventional methods starts with the manufacture of a continuous filament yarn that must undergo secondary processing to avoid its hard and unnatural characteristics. The conventional approaches, such as those mentioned and their many variations, require one or more secondary processes; these are expensive and in many cases difficult to control. Hence, there is a need for a fresh approach in producing natural feeling and appearing yarn of synthetic filaments.

SUMMARY OF THE INVENTION

An object of the invention is an improved sliver-like product of discontinuous synthetic fibers that can be made into a yarn and apparatus for and method of producing such a product, especially in a filament forming operation.

Another object of the invention in an improved sliver-like product including discontinuous fibers that is ready for twisting into a yarn.

Other objects and advantages will become apparent as the invention is more fully described in connection with the following drawings.

DESCRIPTION OF THE DRAWINGS

FIG. 3 is an enlarged front view of the fiber collecting and condensing wheel and the flow apparatus shown in FIGS. 1 and 2.

FIG. 4 is an exploded perspective view of the fiber collecting and condensing wheel and associated apparatus shown in FIGS. 1–3.

FIG. 5 is an enlarged showing an of air nozzle within the hollow collecting and condensing wheel. The air nozzle is used to direct a jet of air to push the fibrous glass product from the circumferential surface of the wheel. FIG. 6 is a front view of another hollow fiber collecting and condensing wheel according to the principles of the invention.

FIG. 7 is a side elevation view of other apparatus for producing a fibrous glass product according to the principles of the invention in a fiber forming operation.

FIG. 8 is a view in elevation of apparatus for twisting a fibrous product made from the apparatus shown in FIGS. 1 and 2.

DESCRIPTION OF THE PREFERRED EMBODIMENTS

Figures 1, 2:
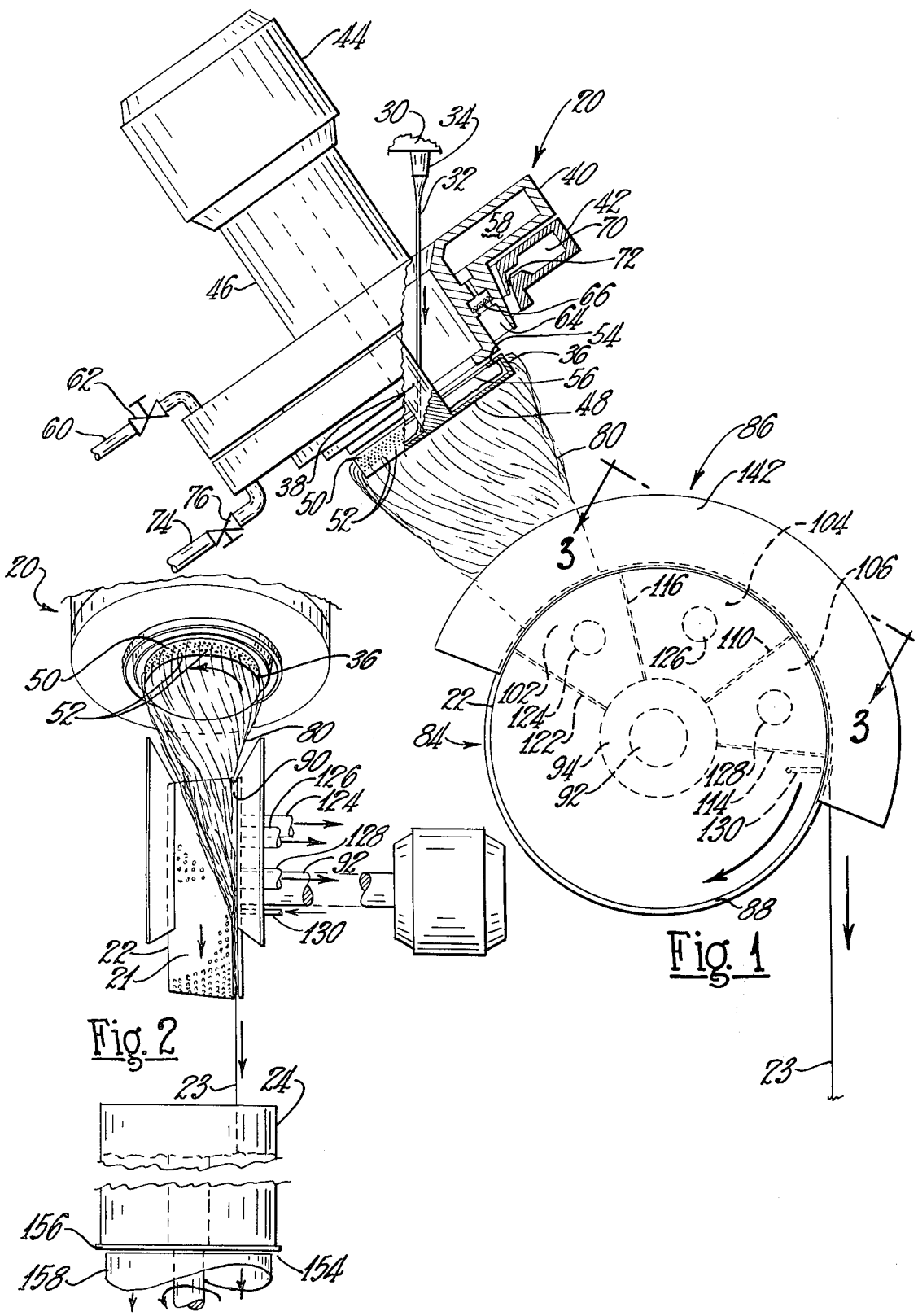
FIG. 1 is a side elevation view of apparatus for producing a fibrous glass product according to the principles of the invention. The apparatus includes a rotary fiber forming means, a rotatably driven hollow fiber collecting and condensing wheel and associated fluid flow apparatus.
FIG. 2 is a front elevation view of the apparatus shown in FIG. 1 together with a container arrangement for collection of the fibrous glass product.

The fibrous product produced according to the invention can be made of organic or inorganic discontinuous synthetic fibers. For example, a fibrous product according to the invention can be made of discontinuous inorganic fibers such as glass and organic fibers such as nylon, polyesters, and the like. So it is to be understood the term synthetic fiber as used in the specification and claims refers to both organic and inorganic synthetic fibers.

The apparatus of the invention produces a fibrous product by first grouping individual synthetic fibers in sufficient interengaging relation to form a thin coherent web or network. The fibers of the web are laterally condensed or gathered together into a fibrous product that is a loosely associated linear wispy sliver-like grouping of fibers possessing sufficient coherency to establish dimensional stability, especially longitudinal dimensional stability.

In practice, it has been useful to produce the fibrous product directly in a fiber forming operation.

FIGS. 1 and 2 show a preferred embodiment of apparatus for producing a fibrous glass product according to the principles of the invention directly in a glass fiber forming operation. A rotary fiber forming means or instrumentality 20 supplies individual discontinuous glass fibers of sufficient length that the fibers can be interengaged into a coherent web or network. In practice the length of the fibers is normally in a range of from 2 to 12 inches. Blasts of fiber attenuating gases from the instrumentality 20 carry the individual fibers to and deposit them on the moving porous circumferential or rim surface 21 of a rotating hollow fiber collection wheel 22 in sufficient number and such interengaging relation to form a thin coherent web or network. Other sources might be used to supply discontinuous fibers. And fibers from the instrumentality 20 might be mixed with fibers from another source to effect a blend of the same or different fibers, e.g., organic and inorganic synthetic fibers.

A web condensing arrangement including means defining a stationary opening of progressively reducing size communicating with the circumferential surface 21 and means for establishing reduced pressure within the wheel 22 to draw a fluid such as air into the opening through the fibers of the web. The moving fluid selectively laterally condenses the web into a longitudinal fibrous product 23 according to the invention.

Means within the wheel 22 clears or releases the product from the surface of the rotating wheel 22. And the tangential energy imparted to the product by rotation of the wheel 22 is sufficient to project the product tangentially away from the wheel 22. The product can be projected downwardly to form a mat or other nonwoven product on a collection surface. FIG. 4 shows the product 23 being collected in a rotating container 24. A winder can be used to collect the product as a wound package.

In the embodiment illustrated a feeder 30 supplies a stream of molten glass 32 from a tubular outlet 34 downwardly to the interior of an inclined hollow centrifuging spinner or rotor 36. The feeder 30 can connect to a forehearth that supplies molten glass from a furnace or can connect to other means for supplying molten glass in a conventional manner.

FIG. 1 illustrates a partial cross section of components of the fiber forming assembly or instrumentality 20, which includes the hollow spinner or rotor 36 fixed on the end of a rotatable shaft or quill 38, a burner 40 that provides a heated environment for primary filaments or centrifuged streams of glass from the spinner 36 and a blower 42 for delivering a gaseous blast into engagement with the primary fibers or small streams of glass to attenuate them into discontinuous glass quill 38, a burner 40 that provides a heated environment for primary filaments or centrifuged streams of glass from the spinner 36 and a blower 42 for delivering a gaseous blast into engagement with the primary fibers or small streams of glass to attenuate them into discontinuous glass fibers.

The assembly 30 is shown in a inclined disposition. In practice an inclination of 45° from the horizontal has given good results.

An electric motor 44 drives the quill 38, and hence the spinner 36, in high speed rotation. The quill 38 is shown disposed in an inclined position extending through a housing 46. Bearings within the housing 46 journally support the quill 38 for rotation.

The spinner 36 as shown is a one piece hollow disc-like member including a circular solid bottom wall 48; a cylindrical circumferential side wall 50 having rows of glass outlet openings or passageways 52 communicating with the interior of the spinner 36; and an inwardly extending circular flange 54 defining an opening 56 at the upper region of the spinner.

The glass stream 32 moves downwardly along a path through the opening 56 to the inclined bottom wall 48. As the motor 44 rotates the spinner 36, the molten glass of the stream moves outwardly along the interior of the circumferential wall 50 and leaves the rotating spinner 36 through the openings 52 as primary fibers or streams.

In practice, the spinner 36 is normally from 4 to 8 inches in diameter and normally includes from 1,000 to 4,000 glass outlet openings. In operation the spinner is normally rotated at an angular speed of from 3,000 to 7,500 rpm's.

The burner 40 includes an annular shaped mixing and distributing chamber 58 with an inlet tube 60. The tube 60 connects at one end with a supply of fuel and air mixture and delivers the mixture to the burner 40. A valve 62 is disposed along the length of the tube 60 to control delivery of the combustible mixture into the annular chamber 58.

The burner 40 provides a variously sized annular discharge passageway 64. The combustible mixture from the chamber 58 is burned in the region of a screen 66 in the passageway 64. Flames or hot gases of combustion from the region of the screen 66 leave the passageway 64 to provide a heated environment for the primary filaments or small streams centrifuged from the openings 52 in the circumferential wall of the rotating spinner 50.

The blower 42 includes a member providing an annular chamber 70 having an air outlet nozzle 72 including circumferentially spaced slots or orifices.

The chamber 70 is supplied with gaseous fluid under pressure, such as compressed air, from a supply through an inlet tube 74. The compressed gas is delivered through the slots of the nozzle 72 as a high velocity gaseous fiber-attenuating blast. A valve 76 is along the tube 74 to regulate the admission of gas to the chamber 70 and hence the velocity of the fiber attenuating blast.

In operation the high velocity products of combustion discharged from the burner 40 flow over the circumferential moving surface of the spinner 36 to engage the primary fibers or streams leaving the openings 52 of the circumferential wall 50. Thereafter the fibers are further engaged by the gaseous blast from the blower 42. Hence, the attenuated fibers are moved by an envelope or body of moving gaseous media; a body 80 of gases and fibers is produced.

The body 80 is, in a sense, an envelope or body of gas and glass fibers moving with generally reducing cross section away from the rotating spinner 36 as more fully explained hereinafter. In practice, the transverse cross sectional shape of the body 80 is generally circular. And in practice, a 3½ inch width wheel 22 (width of the surface 21) has given good results.

Rotation of the spinner 36 imparts a considerable component of angular velocity to the primary glass fibers in a plane substantially perpendicular to the axis of the quill 38. But, the moving blasts of gaseous fluids from the burner 40 and blower 42 modify this initial spinner imparted velocity until the major component of fiber velocity is in a direction moving towards the fiber collection region on the circumferential surface 21 of the rotating wheel 22. Similarly, the initial generally spiral paths imparted to the attenuated fibers by the spinner 36 become a more or less linear path moving in the direction of gas movement toward the circumference of the wheel 22.

The reducing size of the body 80 brings the attenuated fibers into closer and closer relationship. The flow in the body 80 at a location spaced from the spinner 36 brings the fibers together into what can be considered an inchoate or incipient network of gas borne but interconnected fibers. And the wheel 22 is located with its circumferential surface 21 in this region of the body 80. It has been a practice to make the width of the wheel (width of the surface 21) 22 substantially the same size as the diameter of the body 80 in the fiber depositing region.

The fibers are continuously deposited on the moving porous circumferential surface 21 of the hollow wheel 22 in sufficient number and in such interengaging relation that a thin coherent web or network of fibers is continuously formed at a circumferential collection region on the wheel. Fibers of the network are continuously removed from the zone of deposition by the advancing surface 21 and are progressively laterally condensed into a fibrous product. The deposition of the fibers as they are deposited and the "combining" action effected by the movement of the surface 21 work together to orient the fibers generally parallel to the circumferential axis of the surface 21.

Referring to FIGS. 1–4 the web processing apparatus of the wheel 22 and associated apparatus can be seen to include a rotary assembly 84 and a stationary flow directing assembly 86.

In the embodiment shown the rotary assembly 84 includes the wheel 22, which is a one piece bowl shaped member, having a porous circular peripheral wall or rim 88 defining the exterior circumferential surface 21. The surface 21 has a groove 90 fashioned at one edge; the groove 90 extends around the entire circumference of the wheel 22 to form a circular groove and is generally "U" shaped in cross-section. As shown the groove 90 is at the open end of the bowl shaped wheel 22 and extends in the direction parallel to the circumferential axis of the wheel 22.

As shown the wall 88 of the wheel 22 is somewhat tapered towards the closed end of the wheel. Tha angle of taper, shown as angle B in FIGS. 3 and 4, is normally a small angle of from 5° to 20°. The inclined surface 21 promotes a drafting of the fibers and hence an orientation of the fibers in a direction parallel to the circumferential axis of the surface 21 during lateral gathering or condensing of the fibers of the web towards the groove 90 during rotation of the wheel 22.

The wheel 22 is fixed on the end of a shaft 92, which is generally held horizontally for rotation in bearing member 94. The bearing member 94 forms part of the stationary portion of the rotary assembly 84. A motor 98 (see FIG. 2) rotates the wheel 22 through the rotation of the shaft 92.

It is possible to use other means providing a fiber deposition or collection surface. For example, it is possible to use a hollow disc or a hoop such as a wheel with a flat surface. Also, it is possible to use a continuous belt.

Referring more specifically to FIGS. 1 and 4, the stationary assembly includes a circular mounting plate 100, the bearing member 94 and means defining three chambers, viz. chambers 102, 104 and 106.

In the embodiment shown, an enclosure 108 and a partition 110 within the enclosure defines the compartments or chambers 104 and 106. The enclosure 108 includes a sidewall 112, end walls 114 and 116 and a curved top wall 118. The shape of the top wall 118 and of the top of the partition 110 conform to the interior shape of the rim 88 of the wheel 22. The top wall 118 includes a circumferential opening 120 of progressively narrowing dimension. The partition 110 within the enclosure 108 divides its interior into the compartments 104 and 106. One or more compartments can be used.

A partition 122 and the end wall 116, together with the closed end of the wheel 22, form the compartment 102.

A pressure deferential, conventionally accomplished by suction, is maintained across the opening 120.

Each of the compartments communicates with a reduced pressure zone, which can be established in a convention manner. Tubes 124, 126 and 128 each communicate at one end, through an opening in the plate 100, with compartments 102, 104 and 106 respectively. The other end of each of these tubes communicates with an individual reduced pressure zone. Hence, a fluid media such as air can be sucked through the porous rim 88 into each of the compartments. In practice, the tubes 126 and 128 connect the compartments 104 and 106 with zones of unequal reduced pressure to effect a substantially uniform flow of air into the narrowing opening 120 along its entire length. In practice, the suction applied to the chamber 104 is normally in a range of from 5–20 inches of water; the suction applied to the chamber 106 is normally in a range of from 15–20 inches of water.

In practice, the chamber 102 is below the fiber deposition zone of the circumferential surface 21 of the wheel 22. The reduced pressure established in the chamber 102 draws attenuating gases of the body 80 through the porous wall 88 of the wheel 22. Further, the suction traps or holds glass fibers of the body 80 on the moving circumferential surface 21. Normally the suction is sufficient to draw the gases of attenuation into the chamber 102 at a rate that overcomes blow back of these gases from the surface 21. Such blow back tends to disrupt fiber deposition on the surface 21. A suction in the range of from 5–8 inches of water is commonly used.

Further, the motor 98 rotates the wheel 22 sufficiently fast to withdraw the coherent fiber web from the deposition zone at a rate substantially equal to the rate of web formation. However, the speed of the pulling wheel 22 may be varied to change the thickness of the coherent fiber web.

The moving surface 21 advances the web across the top of the enclosure 108 to the opening 120 for condensing. The largest width of the opening 120 is normally substantially the width of the opening of the compartment 102 at the surface 21. As shown the largest width of the opening is somewhat smaller than the width of the compartment 102. The width of the opening 120 can progressively reduce along its entire length, or as shown, can include a narrowing portion 120a and a substantially constant width portion 120b. The portion 120b is generally under the groove 90 into which the product 23 is moved.

In practice air drawn into the opening 120 moves the fibers of the web laterally into the groove 90 as the linear fibrous product 23.

Porosity of the circumferential wall 88 is important. The porosity of the wall 88 must be sufficient to permit fluid flow into the interior of the wheel 22 with sufficient energy to withdraw the gases of fiber attenuation and hold the web onto the advancing surface 21 at the region of fiber deposition. Further, the porosity of the wall 88 must permit sufficient air to flow across the fibers of the web into the opening 120 to progressively condense the web as the web moves across the opening 120. Yet, the openings in the surface 21 should not be so large that fibers become trapped in them. In practice good results have been obtained using a rim 88 with openings having a diameter of 0.070 inches. In such an arrangment these holes are aligned in 24 rows, each having 336 equally spaced openings where the wheel 22 is 14 inches in diameter (smallest diameter) and where the rows are 9/64 of an inch apart.

The stationary assembly includes means for releasing the product from the rotating wheel 22. As more clearly shown in FIGS. 6 and 7, an air tube within the wheel 22 located immediately below the enclosure 108 discharges a stream of air through the porous circumferential wall of the wheel 22. This stream or blast of air directed outwardly through the porous wall 88 wheel 22 effects disengagement of the sliver-like product from the moving wheel. The tube 130 is connected to any supply of suitable gas, e.g., air, under pressure.

Referring more particularly to FIGS. 1–3, the assembly 86 is at the upper side of the wheel 22. And as shown the assembly 86 includes two spaced apart opposing stationary curvilinear wall members or flow director elements 140 and 142 oriented traverse to the axis of the wheel 22 and at the edge regions of the wheel's circumferential surface 22. These members promote reduction in the cross section of the body of gas and fibers 80. The members reduce induced air flow into the body. This keeps the fluid energy of the body 80 high, which effects a contraction of the body 80. The pressure rise of the gaseous fluid of the body 80 must be kept low enough for substantially uniform flow towards the collection surface 21. A steep pressure gradient can cause disturbed fluid flow of the gases.

The wall members 140 and 142 include flow director or control surfaces 140s and 142s, which are inclined to the circumferential surface 21 of the wheel 122. The member 142 is adjacent to the groove 90; as shown the member 142 is at the other edge of the surface 22. A web of substantially uniform fiber concentration across its width is deposited on the rim 88.

The fibers of the web are laterally condensed or gathered as the porous rim 88 of the wheel 22 moves the web across the stationary opening 120 of progressively decreasing or narrowing dimension. Air is moved, e.g., drawn, into the compartments 104 and 106 through the fibers of the web and the porous surface 21 with sufficient energy to progressively laterally move the fibers of the web to condense or gather them as they are moved towards the groove 90. Fiber condensing progressively occurs generally in accordance with the diminishing width of the opening 120.

Normally the reduced pressure zones for both the compartments 104 and 106 are adjusted to effect a uniform drawing of air into them through the fibers of the web along the entire length of the opening 120.

The jet of air from the nozzle 130 within the wheel 22 effects a release of the product 23 from the product delivery groove 90 as the product leaves the compaction or condensing region.

The tangential energy imparted to the product by the rotating wheel 22 projects the product outwardly along a path tangential to the wheel 22.

In FIG. 2 the rotating wheel 22 projects the product 23 downwardly into the container 24. A rotatably driven platform 154 supports the container 24. In other embodiments the product is released more horizontally for collection.

The product is a light wispy and fragile grouping of fibers. Hence, the collection apparatus includes means for drawing air into the open upper end of the container 24 to assist product collection. As shown, the container 24 has a porous bottom wall and the support 154 includes a porous support portion 156. A tubular member 158 is immediately below the container 24; at its remote end the member 158 communicates with a zone of reduced pressure.

The sliver-like fibrous product 23 is capable of being further processed.

FIG. 6 illustrates another embodiment of a fiber collection wheel and associated fluid flow apparatus for laterally condensing a coherent fiber web into a longitudinal fibrous product. The apparatus is shown without flow directing elements like elements 140 and 142 illustrated with the apparatus of FIGS. 1–3.

FIG. 6 shows a driven rotatable wheel 222 having a porous rim 221 with a circumferential groove 224 fashioned on the exterior surface of the rim. The wheel 222 is fixed on a drive shaft 225. The wheel 222 is tapered towards the groove 224 at a angle of inclination denoted as angle C. Angle C is small, e.g., from 10° to 20°, with angles of around 15° being preferred.

In FIG. 6 a web condensing opening 236 is shown. And this opening 236 progressively narrows like the web condensing opening 120 shown in FIGS. 1–4. Fluid suction tubes 228, 230 and 232 are in communication with the interior of the fiber collection wheel. These tubes draw air from the interior of the wheel to establish reduced pressure therein as discussed in relation to the operation of the wheel 22. Further, the embodiment shown in FIG. 6 includes an air supply tube 234 for supplying air under pressure from a suitable source to a nozzle within the wheel 222. The nozzle discharges a stream of air for releasing the fibrous product from the groove 224 as previously discussed with relation to the nozzle 130 within the wheel 122.

FIG. 7 shows another embodiment of apparatus according to the invention. FIG. 7 shows the apparatus of FIG. 1 without the flow directing elements 140 and 142. Instead a hollow member provides a guide passageway through which the body of gases and fibers from the spinner 36 travel to the web forming region on the rim of the wheel 22. Suction means in communication with the guide passageway draws hot gases of the body 80 through the passageway to a remote location for discharge.

As shown an elongated tubular member 250 provides a guide passageway 252; a flexible tube 254 connects the passageway 252 with a suction means 256.

The entrance region of the tubular member 250 includes a flared portion 258 to assist guidance of the body of gas and the fibers 80 into the passageway 252.

The position of the wheel 22 is the same as shown in FIG. 1. So, as explained, the reducing size of the body 80 brings the attenuated fibers into closer and closer relationship. The flow in the body 80 at a location spaced from the spinner 36 brings the fiber together into what can be considered an inchoate or incipient network of gas borne but interconnected fibers. And the wheel 22 is located with its circumferential surface 21 in this region.

The suction means 256 draws hot gases from the body 80 through the passageway 252 beyond the fiber deposition location on the rim of the wheel 22 for exit at a remote location without disturbing formation of the fibrous web on the porous rim of the wheel 22.

As shown the suction means 256 includes a housing 260 within which is located a fan 262 including a blade 264 driven by a motor 266. The fan 262 is mounted on brackets within the hollow housing 260. The screen 268 is located upstream of the fan 262 within the housing 260.

In operation the suction means 256 draws air from the passageway 252 through the flexible tube 254 for exhaust at the discharge end 270 of the hollow housing 260.

FIG. 8 shows apparatus for twisting fibrous product 23. As illustrated a pair of rotatably driven product engaging rollers 280 and 282 advance the product 23 from the container 24 to a conventional textile twisting station 284 including a rotatably driven strand 286, a ring rail 288 and a traveler 290 on the ring rail 288. The twisted product collects as a yarn on a vertically disposed bobbin. The product travels upwardly to turn on a pigtail 292. Thence, the product moves horizontally to turn on a pigtail 294 and thereafter the rollers 280 and 282 pull the product across a sizing applicator 296 and provide the sized product to the twisting station 284 through a guide 298.

I claim:

1. Apparatus for producing a sliver-like fibrous glass product comprising:
   a porous surface upon which a coherent web of discontinuous glass fibers is formed;
   means defining an elongated opening reducing in size along its lengthwise dimension;
   means for moving the surface and the opening relative to each other to effect advancement of a web on the surface lengthwise across the opening in a direction from the larger end of the opening to the smaller end thereof; and
   means effective to draw air through the porous surface into the opening with sufficient energy to condense a coherent web on such surface laterally into a loosely associated longitudinal coherent sliver-like fibrous glass product during advancement of the web across the opening.

2. Apparatus for producing a sliver-like fibrous glass product comprising:
   a perforated surface upon which discontinuous glass fibers are deposited to form a thin coherent fiber web;
   means defining an elongated opening reducing in size along its lengthwise dimension;
   means for moving the surface to effect advancement of a web on the surface lengthwise across the opening in a direction from the larger end of the opening to the smaller end thereof; and
   suction means effective to draw air across a coherent web on the surface into the opening with sufficient energy to condense the web laterally into a loosely associated longitudinal coherent sliver-like fibrous glass product during advancement of the web across the opening.

3. Apparatus for producing a sliver-like fibrous glass product comprising:
   a hollow fiber collection means including a rotatable porous rim upon the exterior surface of which is advanced a coherent web of discontinuous glass fibers;
   means for rotating the rim;
   means within the hollow collection means defining an opening across which the porous rim is advanced during rotation, the opening reducing in size in the direction of rim advancement during rotation thereof; and
   means for establishing reduced pressure within the hollow collection means effective to draw air across a coherent web into the opening with sufficient energy to condense the fibers of the web laterally into a loosely associated longitudinal coherent sliver-like grouping of fibers during advancement of the web on the porous surface across the opening.

4. Apparatus for producing a sliver-like fibrous glass product comprising:
   a hollow fiber collector including a rotatable porous rim upon the exterior surface of which discontinuous glass fibers are deposited in a fixed region to form a coherent fiber web;
   means for rotating the rim and thereby advance a coherent fiber web on the exterior surface from the fixed region;
   means within the hollow collector defining a web condensing opening across which the porous rim with a coherent web thereon is advanced during rotation, the opening reducing in size in the direction of rim advancement during rotation thereof; and
   means for establishing reduced pressure within the hollow collector effective to draw air into the opening through the porous rim and through a coherent web on the rim with sufficient energy to laterally compact the web into a loosely associated longitudinal coherent sliver-like grouping of fibers during advancement of the web across the opening.

5. The apparatus of Claim 4 in which the exterior surface of the rim includes a groove into which the sliver-like grouping of fibers is moved.

6. Apparatus for producing a fibrous product comprising:
   a rotatable fiber collection wheel including a porous rim portion upon which fibers are deposited;
   means for rotating the wheel;
   means for forming a plurality of discontinuous glass fibers of sufficient length to interengage themselves and for conveying the formed fibers in a body of moving gaseous media to the wheel for collection on the porous rim in sufficient interengaging relation to form a coherent web;
   means for establishing a zone of reduced pressure within the wheel to draw gaseous media through the porous rim and thereby hold the web on the rim;
   means within the wheel defining a longitudinal opening having a progressively reducing size in the direction of the circumferential axis of the rim; and
   means for establishing reduced pressure within the wheel to draw air through the fibers of the web into the longitudinal opening to progressively laterally condense the web into a loosely associated coherent sliver-like product during rotation of the wheel.

7. Apparatus of claim 6 wherein the means for forming and conveying the discontinuous glass fibers includes a rotatably driven spinner.

8. Apparatus of claim 4 further including means defining within the hollow fiber collector a chamber providing a stationary open region at the fixed fiber deposit region across which the porous rim is advanced during rotating and means for establishing a reduced pressure within the chamber to draw air into the opening through the porous rim to promote formation of the fibers into the coherent web on the porous rim in the fixed region.

9. Apparatus of claim 7 wherein the circumferential surface of the rim includes a groove at one edge of the rim into which the web is condensed, the groove extending around the entire circumference of the rim in a direction parallel to the circumferential axis of the wheel.

* * * * *